(12) United States Patent
Okada (10) Patent No.: US 10,122,908 B2
(45) Date of Patent: Nov. 6, 2018

(54) IMAGE PICKUP APPARATUS, LENS APPARATUS, AND IMAGE PICKUP SYSTEM

(71) Applicant: CANON KABUSHIKI KAISHA, Tokyo (JP)

(72) Inventor: Koji Okada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/858,334

(22) Filed: Sep. 18, 2015

(65) Prior Publication Data

US 2016/0014325 A1   Jan. 14, 2016

Related U.S. Application Data

(62) Division of application No. 14/394,655, filed as application No. PCT/JP2013/002947 on May 8, 2013, now Pat. No. 9,172,523.

(30) Foreign Application Priority Data

May 14, 2012 (JP) ................................ 2012-110234

(51) Int. Cl.
  *G03B 13/00* (2006.01)
  *H04N 5/232* (2006.01)
  (Continued)

(52) U.S. Cl.
  CPC ......... *H04N 5/23209* (2013.01); *G03B 13/36* (2013.01); *G03B 17/14* (2013.01);
  (Continued)

(58) Field of Classification Search
  None
  See application file for complete search history.

(56) References Cited

U.S. PATENT DOCUMENTS 5,161,026 A * 11/1992 Mabuchi ................. G03B 7/20
                                                           348/222.1
5,485,208 A   1/1996 Mabuchi et al.
(Continued)

FOREIGN PATENT DOCUMENTS

EP      0483822 A2    5/1992
EP      0483822 A3    5/1992
(Continued)

OTHER PUBLICATIONS

Extended European Search Report issued in EP13790173.2, dated Nov. 18, 2015.
(Continued)

*Primary Examiner* — Twyler Haskins
*Assistant Examiner* — Wesley Chiu
(74) *Attorney, Agent, or Firm* — Rossi, Kimms & McDowell LLP (57) ABSTRACT

A lens apparatus is detachable from an image pickup apparatus. The lens apparatus includes a controller configured to communicate with the image pickup apparatus in synchronization with a first signal. A communication contains a plurality of blocks in the same cycle of the first signal. The controller transmits information of a first time period to the image pickup apparatus, and prohibits a communication of an m-th block from starting before the first time period passes after a communication of an n-th block starts or ends where n is an integer equal to or larger than 1 and m is an integer larger than n.

9 Claims, 6 Drawing Sheets

(51) Int. Cl.
    *G03B 17/14*     (2006.01)
    *G03B 13/36*     (2006.01)
    *H04L 7/00*      (2006.01)
    *G02B 7/36*      (2006.01)
(52) U.S. Cl.
    CPC ....... H04L 7/0008 (2013.01); H04N 5/23212
        (2013.01); H04N 5/23296 (2013.01); G02B
        7/365 (2013.01); G03B 2206/00 (2013.01)

(56) References Cited

U.S. PATENT DOCUMENTS

| | | | | |
|---|---|---|---|---|
| 5,608,457 | A * | 3/1997 | Tohyama | H04N 5/23209 |
| | | | | 348/335 |
| 8,374,499 | B2 * | 2/2013 | Sakamoto | H04N 5/23209 |
| | | | | 396/532 |
| 8,542,989 | B2 | 9/2013 | Shibuno et al. | |
| 8,704,944 | B1 * | 4/2014 | Wierzoch | H04N 5/2251 |
| | | | | 348/207.99 |
| 2002/0044206 | A1 | 4/2002 | Kyuma et al. | |
| 2002/0047912 | A1 | 4/2002 | Mabuchi et al. | |
| 2002/0063497 | A1 | 5/2002 | Panasik | |
| 2006/0268158 | A1 * | 11/2006 | Ishiyama | H04N 5/23203 |
| | | | | 348/373 |
| 2009/0028280 | A1 | 1/2009 | Yanagisawa et al. | |
| 2009/0185797 | A1 * | 7/2009 | Ogasawara | G03B 15/05 |
| | | | | 396/59 |
| 2009/0245777 | A1 | 10/2009 | Shibuno et al. | |
| 2009/0245778 | A1 | 10/2009 | Shibuno et al. | |
| 2010/0199009 | A1 | 8/2010 | Koide | |
| 2011/0063497 | A1 | 3/2011 | Kawazoe et al. | |
| 2011/0170853 | A1 * | 7/2011 | Osawa | G03B 7/20 |
| | | | | 396/529 |
| 2012/0105711 | A1 | 5/2012 | Kudo et al. | |
| 2012/0155853 | A1 * | 6/2012 | Osawa | G03B 17/14 |
| | | | | 396/529 |
| 2012/0183285 | A1 | 7/2012 | Shibuno et al. | |
| 2013/0003715 | A1 * | 1/2013 | Xhafa | H04W 52/0229 |
| | | | | 370/349 |
| 2013/0141609 | A1 * | 6/2013 | Watazawa | G03B 17/14 |
| | | | | 348/222.1 |
| 2013/0182171 | A1 | 7/2013 | Kawanishi | |
| 2013/0182175 | A1 | 7/2013 | Yasuda | |
| 2015/0281534 | A1 * | 10/2015 | Nakata | H04N 5/23209 |
| | | | | 348/373 |

FOREIGN PATENT DOCUMENTS

| | | |
|---|---|---|
| EP | 2280306 A1 | 2/2011 |
| JP | 03114371 A | 5/1991 |
| JP | 07306434 A | 11/1995 |
| JP | 09033793 A | 2/1997 |
| JP | 2009258718 A | 11/2009 |
| JP | 2013007838 A | 1/2013 |

OTHER PUBLICATIONS

International Search Report issued in PCT/JP2013/002947 dated Aug. 20, 2013.
Written Opinion issued in PCT/JP2013/002947 dated Aug. 20, 2013.
Office Action issued in CN201380024649.0, dated Jul. 30, 2015.
Notice of Allowance issued in U.S. Appl. No. 14/394,655, dated Jun. 26, 2015.

* cited by examiner

IMAGE PICKUP APPARATUS, LENS APPARATUS, AND IMAGE PICKUP SYSTEM

TECHNICAL FIELD

The present invention relates to an image pickup apparatus, a lens apparatus, and an image pickup system.

BACKGROUND ART

A contrast type autofocus (referred to as a "TVAF" hereinafter) has been conventionally known and configured to move a focus lens so that the sharpness (focus signal) of a signal obtained from an image sensor can become maximum. A lens interchangeable type camera system has also been known in which an image pickup apparatus (camera body), such as a digital still camera and a digital camera, generates a focus signal, and a focus lens is driven in an interchangeable lens that is attached to and detachable from the camera body. It is necessary for the TVAF control in this lens interchangeable type camera system to manage the generating timing of the focus signal and the driving timing of the focus lens.

Patent Literature ("PLT") 1 discloses a method of setting the driving timing of the focus lens in the TVAF control in this lens interchangeable type camera system. PLT 2 proposes a method of transmitting a busy signal from an interchangeable lens to a camera body when the interchangeable lens cannot communicate or cannot execute a command from the camera body.

CITATION LIST

Patent Literature

[PTL 1] Japanese Patent Laid-Open No. 2009-258718
[PTL 2] Japanese Patent Laid-Open No. 7-306434

SUMMARY OF INVENTION

Technical Problem

In the lens interchangeable camera system in PLT 1, each interchangeable lens attachable to the camera body has a different optical characteristic, and it is thus difficult to properly provide the TVAF control for all interchangeable lenses. PLT 2 generates a busy signal having a different length for each predetermined timing, and the control may be lost in a variety of lens control in synchronization with a vertical synchronizing signal (or its integer times) due to a lowered communication speed and a random communication timing.

The present invention provides an image pickup apparatus, a lens apparatus, and an image pickup system, in which the lens apparatus can be properly corrected.

Solution to Problem

A lens apparatus according to the present invention is detachable from an image pickup apparatus. The lens apparatus includes a controller configured to communicate with the image pickup apparatus in synchronization with a first signal. The communication contains a plurality of blocks in the same cycle of the first signal. The controller transmits information of a first time period to the image pickup apparatus, and prohibits a communication of an m-th block from starting before the first time period passes after a communication of an n-th block starts or ends where n is an integer equal to or larger than 1 and m is an integer larger than n.

Further features and aspects of the present invention will become apparent from the following description of exemplary embodiments with reference to the attached drawings.

Advantageous Effects of Invention

The present invention can provide an image pickup apparatus, a lens apparatus, and an image pickup system, in which the lens apparatus can be properly corrected.

DESCRIPTION OF EMBODIMENTS

Figure 1:
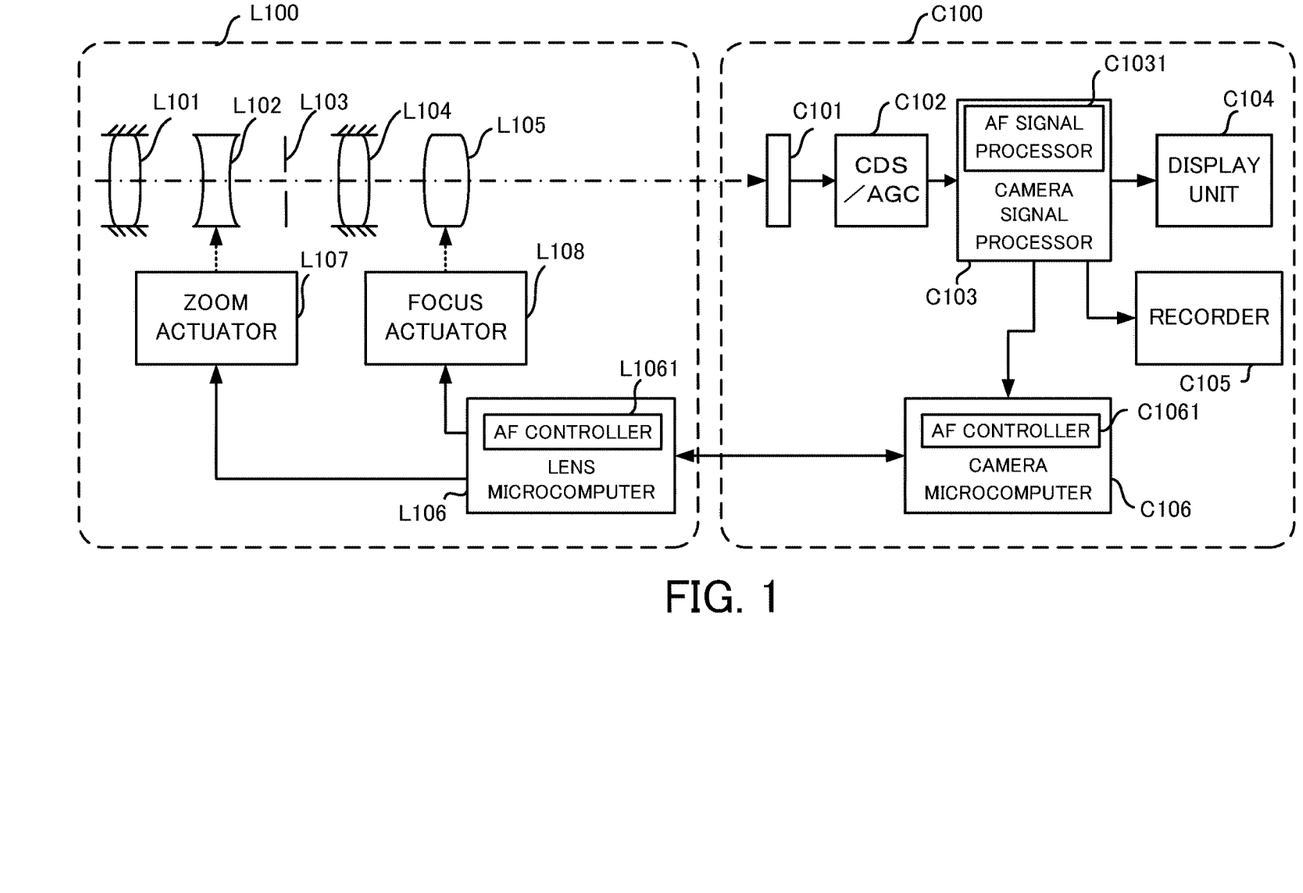
FIG. 1 is a block diagram of a lens interchangeable type camera system according to first and second embodiment of the present invention.

FIG. 1 is a block diagram of a lens interchangeable type camera system (image pickup system or optical apparatus) according to the present invention. The camera system includes a lens unit (lens apparatus) L100 and camera body C100 (image pickup apparatus or optical apparatus). The lens unit L100 is detachably attached to the camera body C100.

The lens unit L100 includes an image pickup optical system, a lens microcomputer (lens controller) L106, a zoom actuator L107, and a focus actuator L108.

The image pickup optical system includes a plurality of optical lens unit (optical elements), and forms an optical image of an object. The image pickup optical system according to this embodiment includes, in order in the incident direction of the object image, a first fixed lens L101, a magnification varying lens L102, a diaphragm L103, a second fixed lens L104, and a focus lens L105. The first fixed lens L101 and the second fixed lens L104 are maintained stationary. The magnification varying lens (zoom lens) L102 moves in the optical axis direction for varying a magnification. The diaphragm L103 adjusts a light quantity. The focus lens L105 serves to correcting an image plane fluctuation associated with the magnification variation, and to provide focusing. In FIG. 1, each lens unit has only lens but actually may have one or more lenses.

The lens microcomputer L106 communicates with a camera microcomputer C106 in the camera body C100 at a timing suitable for an image pickup timing. Thereby, the TVAF control becomes easier. In the TVAF, the camera body C100 determines a driving amount of the focus lens L105 by evaluating the in-focus state of the image pickup plane for each predetermined cycle, and instructs the lens unit L100 to drive the focus lens L105. An in-focus state is again evaluated at the next timing, and a similar operation is performed but at this time the reliability of the focus information degrades if the lens driving timing is not synchronized.

More specifically, the camera microcomputer C106 and the lens microcomputer L106 performs a fixed-length packet communication at a timing synchronized with a vertical synchronizing signal (vertical synchronizing communication). A first communication from the lens microcomputer L106 to the camera microcomputer C106 as a first block of the packet communication is used to transmit a position of the focus lens L105, an aperture value of the diaphragm L103, a position of the zoom lens L102, and operating information. A second communication from the camera microcomputer C106 to the lens microcomputer L106 is used as a second block of the packet communication to transmit a focus control command (for motor driving, etc.) such as a target defocus amount, a result calculated based upon information received in the first communication, etc.

The first communication and the second communication constitute a plurality of blocks contained one each in the same cycle of the first signal that is the vertical synchronizing signal (VD) or its integer times, and are bidirectional communications performed between the camera microcomputer C106 and the lens microcomputer L106. It is sufficient that at least two blocks exist in the same cycle in the first signal, and the number is not limited. In this embodiment, the first communication is an initial communication and the second communication is the last communication in the vertical synchronizing period.

The first communication and the second communication communicate other information, such as various status information set by a user through a button, a dial, and a switch (not illustrated in FIG. 1), and the diaphragm and zoom driving commands.

The lens microcomputer L106 includes a lens AF controller L1061. The lens AF controller L1061 controls focusing in accordance with a target position of the focus lens L105 determined by the camera AF controller C1061. The lens AF controller L1061 provides a zoom tracking control configured to move the focus lens L105 based upon zoom tracking data (a zoom tracking cam) stored in the lens microcomputer L106 in the magnification variation. This configuration prevents an image plane fluctuation (blur) associated with the magnification variation.

The zoom actuator L107 moves the magnification varying lens L102, and the focus actuator L108 moves the focus lens L105. Each of the zoom actuator L107 and the focus actuator L108 includes an actuator, such as a stepping motor, a DC motor, an oscillatory motor, and a voice coil motor.

The camera body C100 includes an image sensor C101, a CDS/AGC/AD converter C102, a camera signal processor C103, a display unit C104, a recorder C105, and a camera microcomputer C106.

The image sensor C101 is a photoelectric converter, such as a CCD sensor and a CMOS sensor, and outputs an analogue signal by photoelectrically converting an object image. The image sensor C101 may be provided one each for each of three primary colors of red (R), green (G), and blue (B).

The CDS/AGC/AD converter C102 samples an output of the image sensor C101, gain-controls and digitally converts the sampled output.

The camera signal processor C103 performs various image processing for an output signal from the CDS/AGC/AD converter C102, and generates an image signal. The camera signal processor C103 includes an AF signal processor (focus signal generator) C1031. The AF signal processor C1031 generates a focus signal by extracting a high frequency component or a brightness difference component generated from the high frequency component in the output signal from a pixel in an area used for a focus detection in an output signal from all pixels derived from the image sensor C101 and the CDS/AGC/AD converter C102. The focus signal is referred to as a contrast evaluation value signal, and represents the sharpness (contrast state) of an image generated based upon the output signal from the image sensor C101. The sharpness changes according to a focus state of the image pickup optical system and consequently, the focus signal represents the focus state of the image pickup optical system.

The display unit C104 displays an image signal from the camera signal processor C103, and the recorder C105 records an image signal from the camera signal processor C103 in a recording medium, such as a magnetic tape, an optical disk, and a semiconductor memory.

The camera microcomputer (image pickup apparatus controller) C106 controls the focus actuator L108 in the lens unit L100 based upon the output from the camera signal processor C103, and moves the focus lens L105 in the optical axis direction. This operation is performed mainly by the camera AF controller C1061 in the camera microcomputer C106. A detailed operation of the camera AF controller C1061 will be described later.

The camera body C100 includes a power supply unit (battery) and a power switch (not illustrated), and whether power is supplied to each component in the camera body C100 can be selected. The lens unit L100 is provided with the power from the camera body C100 through a power supply line (not illustrated).

[First Embodiment]

Figure 2:
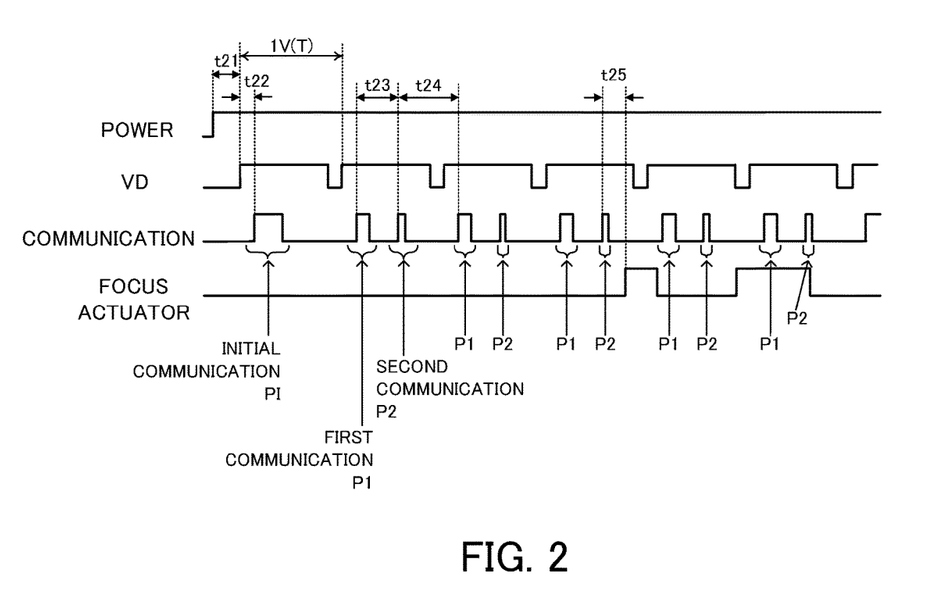
FIG. 2 is a timing chart of a communication between a lens microcomputer and a camera microcomputer illustrated in FIG. 1 according to the first embodiment.

FIG. 2 is a timing chart of a communication between the lens microcomputer L106 and the camera microcomputer C106. In FIG. 2, "power" has an ON (high) or OFF (low) state when a user operates a power switch (not illustrated) in the camera body C100. "VD" represents a vertical synchronizing signal. A "communication" represents a signal transmitted from the lens microcomputer L106 or the camera microcomputer C106. A "focus actuator" represents a driving state of the focus actuator L108.

When the power is supplied by the operation of the power switch, the camera microcomputer L106 generates the VD after a time period t21, and starts an initial communication PI after a time period t22. The initial communication PI is a communication initially performed after the power is turned on or the lens unit L100 is attached to the camera body C100. When a bidirectional fixed-length packet communication is performed at timings synchronized with the VD, the initial communication PI that has a format different from that of each of other subsequent communications is performed in a first one cycle (1V).

Subsequent to the next cycle, a communication that includes two blocks of the first communication P1 and the second communication P2 is performed in the first one cycle (1V). The time period t22 from the leading edge of the VD to a leading edge of the initial communication PI can be set to an arbitrary timing based upon the image signal storage timing of the image sensor C101, but a delay time period to the VD needs to be always constant.

The initial communication PI according to this embodiment transmits at least following three pieces of information from the lens microcomputer L106 to the camera microcomputer C106 but it is sufficient according to the present invention that at least one piece of information is contained.

First information is information of a first time period (a standby time period within a cycle or an intra-cycle standby time period) from a start (leading edge) or end (trailing edge) of the first communication P1 to a start (leading edge) of the second communication P2 within the same cycle. The first information corresponds to a time period t23 in FIG. 2. Now assume a plurality of blocks contained in the same cycle include n-th (n is an integer equal to or larger than 1) and m-th (m is an integer larger than n). Then, the lens microcomputer L106 transmits information of the intra-cycle standby time period to the camera microcomputer C106, and maintains a time period from the start or end of the communication of the n-th block to the start of the communication of the m-th block in the same cycle not to be shorter than the intra-cycle standby time period. In other words, the communication of the m-th block in the same cycle is prohibited from starting before the intra-cycle standby time period passes after the communication of the n-th block starts or ends. The standby time period is provided because it takes a time to process plural information in each block communication (packet communication), this is similar to another standby time period.

Second information is information of a second time period (out-of-cycle standby time period or out-of-cycle standby time period) from a start or end of the communication of the last block (second communication P2) to the first communication P1 as a first block communication in the next cycle. The second information corresponds to a time period t24 in FIG. 2. The lens microcomputer L106 transmits the information of the out-of-cycle standby time period to the camera microcomputer C106, and maintains a time period from the start or end of the communication of the last block in one cycle to the start of the communication of the first block in the next cycle not to be shorter than the out-of-cycle standby time period. In other words, the communication of the first block in the next cycle is prohibited from starting before the out-of-cycle standby time period passes after the communication of the last block starts or ends in one cycle.

Third information is information of a third time period (actuator standby time period) from a start or end of the second communication P2 to a driving start of the focus actuator L108. The third information corresponds to a time period t25 in FIG. 2. Now assume that a plurality of blocks contained in the same cycle contain n-th block (n is an integer equal to or larger than 1). Then, the lens microcomputer L106 transmits information of the actuator standby time period to the camera microcomputer C106. After the communication of the n-th block starts or ends, and before the actuator is ready to be driven in the same cycle, the lens microcomputer L106 is prohibited from receiving a command of starting driving the actuator. In other words, the lens microcomputer L106 is prohibited from instructing the actuator to drive before the actuator standby time period passes after a communication of an n-th block starts or ends where n is an integer equal to or larger than 1.

In the initial communication PI, status information that is not affected by a state, such as a communication format, a communication speed, a corresponding function, and an individual identification information, with which the lens unit L100 and the camera body C100 are compatible.

In the lens interchangeable type camera system, a computing speed and a data amount to be processed of the lens microcomputer L106 are different according to a type of the lens unit L100. For example, an inexpensive microcomputer has a low computing speed because the microcomputer utilizes a reduced operational clock for reducing power consumption. The data amount to be processed varies due to the function of the lens unit L100, such as automatic zooming, AF, image stabilizing, diaphragm control, ND filter control, and built-in telecommunication control, and the precision of each function, and a processing speed is consequently different. In other words, among the time periods t23, t24, and t25, the processing contents and processing time periods of the lens microcomputer L106 are different according to the type of the lens unit L100. If the camera microcomputer C106 provides a communication through a control by designating the driving time without considering the difference of the processing time period, etc. the control may be lost and, for example, the actuator inaccurately moves. Accordingly, the camera microcomputer C106 provides a communication and a lens control by considering the intra-cycle standby time period, the out-of-cycle standby time period, and the actuator standby time period.

Now assume that a cycle of the VD is set to T, such as 16.67 ms. Then, a total of the first time period and the second time period satisfies t23+t24<=T so as not to exceed the cycle of the first signal. When this conditional expression cannot be satisfied, the camera microcomputer C106 extends a communication period.

Figure 3:
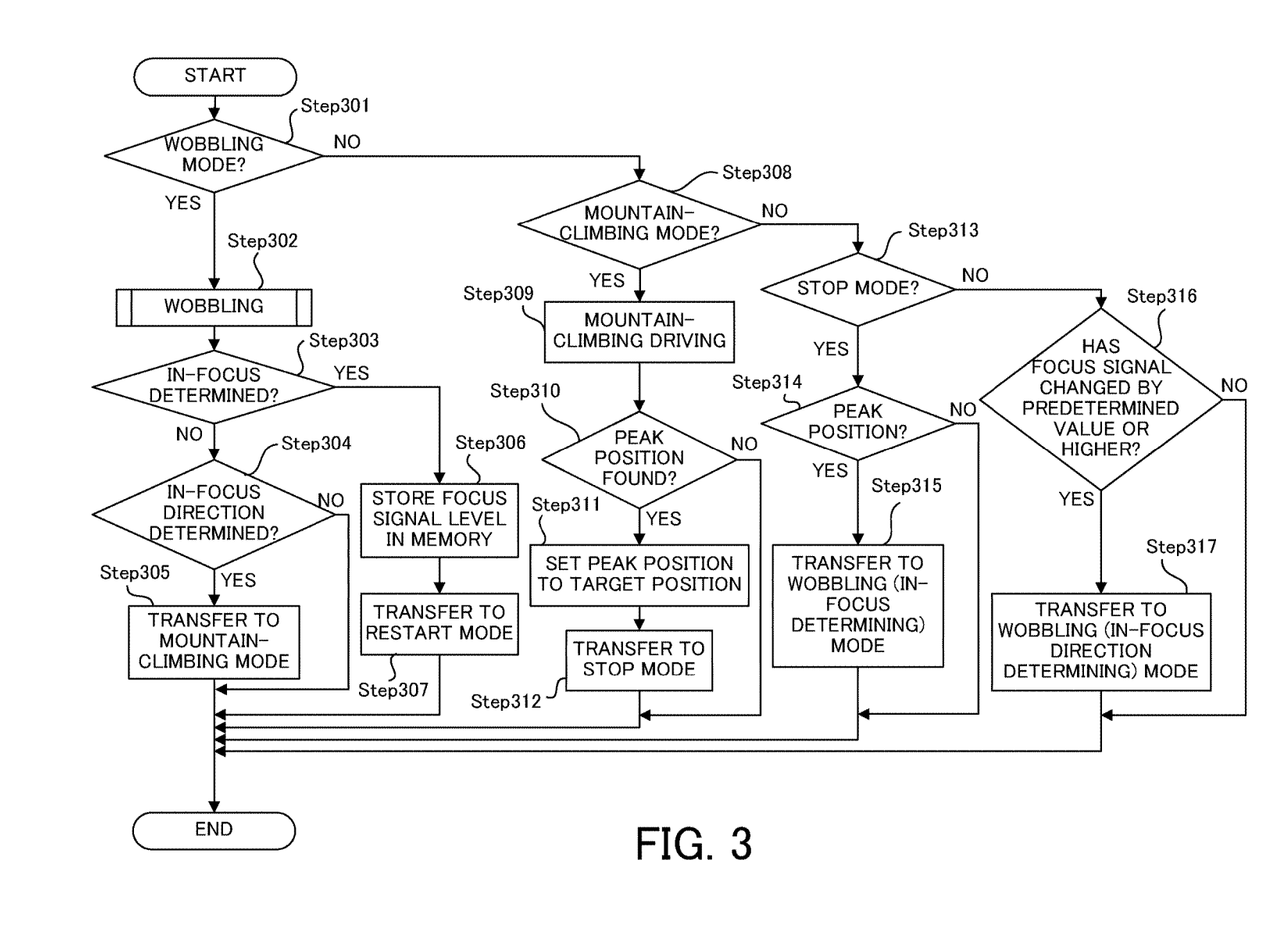
FIG. 3 is a flowchart of a TVAF control illustrated in the camera system illustrated in FIG. 1 according to the first and second embodiments.
Figure 4:
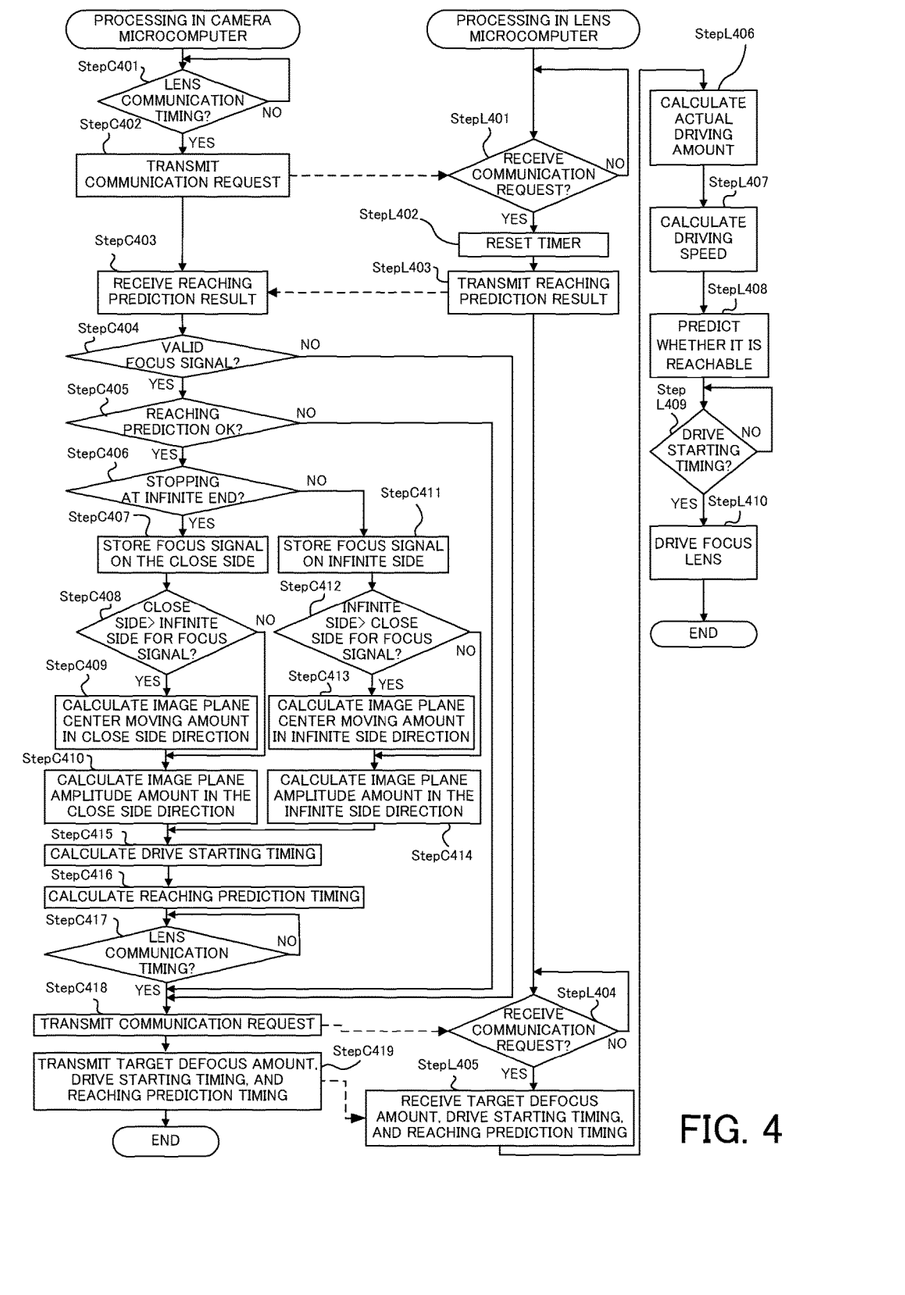
FIG. 4 is a flowchart for explaining detailed controls of the lens microcomputer and the camera microcomputer in a wobbling step illustrated in FIG. 3 according to the first and second embodiments.
Figure 5:
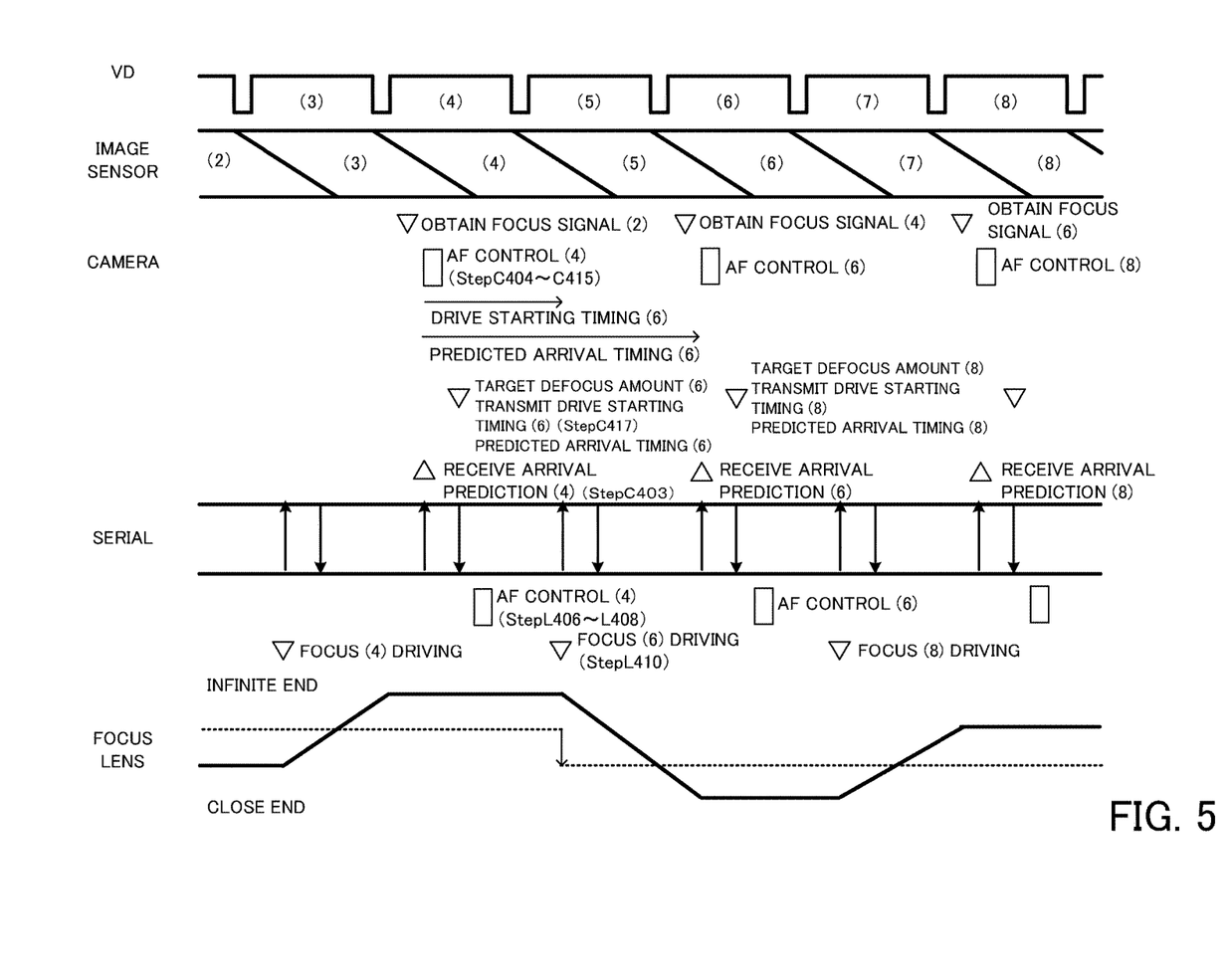
FIG. 5 is a timing chart of the focus control according to the first and second embodiment of the present invention.

Referring now to FIGS. 3 to 5, a description will be given of the focus control (TVAF control) performed by the lens microcomputer L106 and the camera microcomputer C106.

FIG. 3 is a flowchart of an overview of the TVAF control. This procedure is mainly executed by the camera AF controller C1061 in the camera microcomputer C106 in accordance with a computer program. The camera microcomputer C106 (camera AF controller C1061) controls driving and a position of the focus lens L105 through communications with the lens microcomputer L106 (lens AF controller L1061).

In FIG. 3, in Step 301, the camera microcomputer C106 determines whether the current TVAF mode is a wobbling mode. If so the flow moves to the Step 302, and if not the flow moves to Step 308.

In Step 302, the camera microcomputer C106 performs a wobbling operation so as to wobble the focus lens L105 with the predetermined amplitude, and determines whether it is in-focused or if not determines which direction an in-focus point exists. A detailed operation will be described with reference to FIGS. 4 and 5.

In Step 303, the camera microcomputer C106 determines whether the focus lens L105 reciprocates in the same area a predetermined number of times based upon the positional history of the focus lens L105 as a result of the wobbling operation in the Step 302. If so, the in-focus is determined and the flow moves to Step 306, and if not, the in-focus has not yet been determined and the flow moves to Step 304.

In the Step 304, the camera microcomputer C106 determines whether it has determined that the in-focus point exists in the same direction a predetermined number of times based upon the positional history of the focus lens L105 as a result of the wobbling operation in the Step 302. If so the in-focus direction is determined and the flow moves to Step 305 for the mountain-climbing (peak searching) mode, and if not the in-focus direction has not yet been determined and the flow returns to the Step 301.

In the Steps 306, the camera microcomputer C106 stores a focus signal level at the in-focus time in a memory (not illustrated), and the flow moves to Step 307 for the restart determining mode. The restart determining mode is a mode configured to determine whether wobbling is again necessary to determine the in-focus direction (Steps 316 and 317).

In the Step 308, the camera microcomputer C106 determines whether the current TVAF mode is a mountain-climbing mode, and if so the flow moves to Step 309, and if not the flow moves to Step 313.

In the Step 309, the camera microcomputer C106 provides the mountain-climbing configured to drive the focus lens L105 at a predetermined speed in which a value of the focus signal increases. A detailed description of the mountain-climbing operation will be omitted.

In Step 310, the camera microcomputer C106 determines whether the position of the focus lens L105 (referred to as a "peak position" hereinafter) which provides a maximum value (a value representing the in-focus state of the image pickup optical system) is detected according to the mountain-climbing in the Step 309. When the peak position is detected, the flow moves to Step 311, and if not the flow returns to the Step 301 so as to continue the mountain-climbing mode. When the peak position is determined in the Step 310, the focus lens L105 is moved to the peak position so as to execute the in-focus determining mode (Step 315).

In the Step 311, the camera microcomputer C106 sets the peak position to the target position of the focus lens L105. Then, the flow moves to Step 312 for the stopping mode.

In the Step 313, the camera microcomputer C106 determines whether the current TVAF mode is the stopping mode, and if so the flow moves to Step 314, and if not the flow moves to Step 316.

In the Step 314, the camera microcomputer C106 determines whether the focus lens L105 has returned to the peak position. If so, the flow moves to the Step 315 for the wobbling mode so as to determine the in-focus, if not the flow returns to the Step 301 so as to continue the stopping mode.

In the Step 316, the camera microcomputer C106 compares the level of the current focus signal with the level of the focus signal held in the Step 306, and determines whether the variation amount is larger than the predetermined amount. When the variation amount is larger than the predetermined amount, the flow moves to Step 317 for the wobbling mode so as to determine the in-focus direction, if not the flow returns to the Step 301 so as to continue the stopping mode.

Referring now to FIGS. 4 and 5, a description will be given of the flow of the control of the camera microcomputer C106 and the lens microcomputer L106 in the Step 302 illustrated in FIG. 3.

In FIG. 4, in Step C401, the camera microcomputer C106 determines whether the current timing for the VD of the image accords with the predetermined timing of the communication (referred to as "lens communication" hereinafter) with the lens microcomputer L106. If so, the flow moves to Step C402, and if not the flow returns to the Step C401 for standing by. The timing of the lens communication for the VD corresponds to the time period t22 in FIG. 2. One condition to determine this timing contains an elapse of a time period equal to or longer than the out-of-cycle standby time period (equal to or longer than the time period t24) after the second communication P2 in just one previous cycle. The camera microcomputer C106 utilizes a time measuring unit, such as an internal timer or counter (not illustrated) so as to determine the Step C401.

In the Step C402, the camera microcomputer C106 transmits a communication request to the lens microcomputer L106 so as to start the lens communication (first communication P1).

In Step L401, the lens microcomputer L106 determines whether it has received the communication request transmitted from the camera microcomputer C106 in the Step C402, and if so the flow moves to Step L402, and if not the flow returns to the Step L401 for standing by.

In the Step L402, the lens microcomputer L106 resets the internal timer using the start of the first communication P1 as a trigger, and measures a delay time period from the start of the lens communication.

In Step L403, the lens microcomputer L106 transmits a reaching prediction result calculated in the previous processing to the camera microcomputer C106. This communication corresponds to the first communication P1. The content of the reaching prediction will be described in detail later in Step L408.

In the Step C403, the camera microcomputer C106 receives the reaching prediction result transmitted from the lens microcomputer L106 in the Step L403 in the first communication P1. In the example illustrated in FIG. 5, if the current VD is (4), then the processing corresponds to the timing (4) of receiving the reaching prediction.

In Step C404, the camera microcomputer C106 determines whether the currently available focus signal is valid. In other words, it determines whether the image signal as the source of the focusing signal has been stored not in driving the focus lens L105 but in stopping the focus lens L105 at the past target position. If it is valid, the flow moves to Step C405, and if not the flow moves to Step C416.

In the example of FIG. 5, if the current VD is (4), the available focus signal herein is generated from the image signal stored with the VD(2). Since the focus lens L105 is stopped on the close side in the VD(2), the focus signal generated from the image signal stored in the VD(2) is determined valid. If the current VD is (5), then the available focus signal is generated from the image signal stored with the VD(3). The focus signal generated from the stored image signal with the VD(3) is determined invalid since the focus lens L105 was moved from the infinite side to the close side in the VD(3).

In the Step C405, the camera microcomputer C106 moves to the Step C406 when the previous reaching prediction result received in the Step C403 is reachable (when the information representing that the focus lens L105 can reach the target position). If not (when the information representing that the focus lens L105 cannot reach the target position), the flow moves to Step C418.

For example, when the information that is sent from the lens microcomputer L106 at the timing of the reaching prediction (4) and represents being reachable, it means that the focus lens L105 can reach the target position until the electric charge used to generate the focus signal with the VD(4) is stored. On the other hand, when the information that is sent from the lens microcomputer L106 at the timing of the reaching prediction (4) and represents being unreachable, it means that the focus lens L105 cannot reach the target position until the electric charge used to generate the focus signal with the VD(4) is stored.

When the information representing being unreachable is received in the first communication P1, the focus lens L105 is now being driven and it is likely that a sufficient defocus amount cannot be obtained from the next available focus signal. In order to avoid the malfunction, it is necessary to delay the cycle of the TVAF control. Hence, the flow moves to Step C418 without moving forward the TVAF control (wobbling operation), or the TVAF control is restricted.

For example, when receiving the information representing being unreachable at the timing of the reaching prediction (4) (in the first communication with the VD(4)), the camera microcomputer C106 does not transmit a driving command of driving the focus lens L105 in the close side direction at the timing of the target defocus amount (6). When receiving the information representing being reachable in the next first communication (first communication with the VD(5)), the camera microcomputer C106 transmits a driving command of driving the focus lens L105 in the close side direction in the second communication with the same VD(5).

In Step C406, the camera microcomputer C106 determines whether the focus lens L105 is now stopping on the infinite side with respect to the center position as the driving center, and if so the flow moves to the Step C407, and if not the flow moves to the Step C410. In the example of FIG. 5, if the current VD is (4), it is determined that the focus lens L105 is stopped on the infinite side. When the current VD is (6), it is determined that the focus lens L105 is stopped on the close side.

In Step C407, the camera microcomputer C106 stores the focus signal on the close side. When the current VD is (4) in the example of FIG. 5, the focus signal (2) is stored which was generated from the image signal stored with the VD(2) at which the focus lens L105 is stopped on the close side.

In the Step C408, the camera microcomputer C106 compares the level of the focus signal on the close side stored in the Step C407 with the level of the focus signal on the infinite side which was stored in the past in Step C410, which will be describe later. If the level on the close side is higher, the flow moves to Step C409, and if not the flow moves to Step C413. When the current VD is (4) in the example of FIG. 5, the focus signal (2) is compared with the focus signal 0 (not illustrated).

In the Step C409, the camera microcomputer C106 calculates, as a defocus amount on the image pickup plane of the image sensor C101 (image plane center moving amount), a moving amount in a close side direction of the center position that is the driving center of the focus lens L105. This defocus amount is set to a value within the depth of focus.

In the Step C410, the camera microcomputer C106 calculates, as a defocus amount on the image pickup plane (image plane amplitude amount), a driving amount with respect to the center position of the focus lens L105 in the close side direction. Similar to the moving amount of the center position, this defocus amount is set to a value within the depth of focus.

In Step C411, the camera microcomputer C106 stores a focus signal on the infinite side. When the current VD is (6) in the example of FIG. 5, the focus signal (4) is stored which was generated from an image signal stored with the VD(4) at which the focus lens L105 is stopped on the infinite side.

In Step C412, the camera microcomputer C106 compares the level of the focus signal on the infinite side stored in the Step C411 with the level of the focus signal on the close side which was previously stored in the Step C407. If the level on the infinite side is higher, the flow moves to Step C413, and if not, the flow moves to Step C414. When the current VD is (6) in the example of FIG. 5, the focus signal (4) is compared with the focus signal (2).

In the Step C413, the camera microcomputer C106 calculates, as a defocus amount on the image pickup plane of the image sensor C101 (image plane center moving amount), a moving amount in an infinite side direction of the center position that is the driving center of the focus lens L105. This defocus amount is set to a value within the depth of focus.

In the Step C414, the camera microcomputer C106 calculates, as a defocus amount on the image pickup plane (image plane amplitude amount), a driving amount with respect to the center position of the focus lens L105 in the infinite side direction. Similar to the moving amount of the center position, this defocus amount is set to a value within the depth of focus.

In the Step C415, in order to obtain a defocus amount (target defocus amount) calculated in the Steps C409, C410, C413, and C414, the camera microcomputer C106 calculates the timing used to actually start driving the focus lens L105.

Herein, the timing (drive staring timing) used to start driving the focus lens L105 is based upon the storage completing timing of an image signal of the image sensor C101, and set by considering the above actuator standby time period. In addition, this embodiment defines this drive starting timing as a delay time period from the start of the first communication. However, the present invention is not limited to this embodiment, and a delay time period for the vertical synchronizing signal, a delay time period from the start of the second communication, etc. may be used.

In Step C416, the camera microcomputer C106 calculates the timing used to predict whether the above target defocus amount is actually obtained in driving the focus lens L105 at the drive starting timing calculated in the Step C415. In other words, the lens microcomputer L106 predicts whether the focus lens L105 can reach the target position corresponding to the target defocus amount at the reaching prediction timing that is the calculated (designated) timing.

Herein, the reaching prediction timing is set based upon the storage starting timing of the image signal of the image sensor C101. According to this embodiment, this reaching prediction timing is defined by the delay time period from the start of the above first communication. However, the present invention is not limited to this embodiment, and a vertical synchronizing signal, a delay time period from the start of the second communication, may be defined.

In Step C417, it is determined whether the current timing accords with the timing in the lens communication. If so, the flow moves to Step C418, and if not the flow returns to the Step C417 for standing by. One condition to determine this timing includes a passage of a time period equal to or longer than the above intra-cycle standby time period from the first communication.

In the Step C418, the camera microcomputer C106 again transmits a communication request to the lens unit, and starts the lens communication (second communication). Herein, the lens microcomputer L106 determines whether the lens microcomputer L106 has received the communication request transmitted from the camera microcomputer C106 in the Step C416, and if so the flow moves to the Step L405, and if not the flow returns to the Step L404 for standing by.

In the Step C419, when the lens communication starts, the camera microcomputer C106 transmits information of the target defocus amount calculated in the Steps C409, C410, C413, and C414 to the lens microcomputer L106. The information of the drive starting timing and the reaching prediction timing calculated (designated) in the Steps C415 and C416 are also transmitted to the lens microcomputer L106. If the current VD is (4) in the example of FIG. 5, this processing corresponds to the transmission timing of the target defocus amount (6), the drive start timing (6), and the reaching prediction timing (6). If the reaching prediction result received in the Step C403 is being unreachable, then the camera microcomputer C106 transmits the image plane amplitude amount of the value similar to that in the previous communication the image plane center moving amount of 0 in the target defocus amount (6).

On the other hand, in the Step L405, the lens microcomputer L106 receives the target defocus amount, the drive start timing, and the reaching prediction timing transmitted from the camera microcomputer C106 in the Step C419.

In the Step L406, the lens microcomputer L106 calculates an actual driving amount (or target position) of the focus lens L105 by considering the current focus position sensitivity so that the target defocus amount received in the Step L405 can be obtained.

In the Step L407, the lens microcomputer L106 calculates a driving speed of the focus lens L105 in accordance with the actual driving amount calculated in the Step L406.

In the Step L408, the lens microcomputer L106 provides a reaching prediction where the focus lens L105 is driven at the driving speed calculated in the Step L407 at the drive starting timing received in the Step L405. More specifically, it is predicted whether the predicted driving amount of the focus lens L105 from the drive starting timing to the reaching prediction timing received in the Step L405 reaches the actual driving amount (target position) of the focus lens L105 calculated in the Step L406. Thus, the lens microcomputer L106 predicts whether the focus lens L105 can reach the target position. The reaching prediction result is transmitted in the first communication from the lens microcomputer L106 to the camera microcomputer C106 in the next Step L403.

In the Step L409, the lens microcomputer L106 refers to the value of the internal timer reset in the Step L402, and determines whether the delay time period from the start of the first communication accords with the drive starting timing received in the Step L405. If it accords, the flow moves to the Step L410, and if not the flow returns to the Step L409 for standing by.

Herein, the drive starting timing is the timing considering a time period (actuator standby time period) necessary for the lens microcomputer L106 to finish various operational processing for realizing the Steps L405 to L408 and another function other than focusing not illustrated in FIG. 4.

In the Step L410, the lens microcomputer L106 sets the actual driving amount found in the Step L406 and the driving speed calculated in the Step L407 to the focus actuator L108, and actually drives the focus L105. When the current VD is (4) in the example of FIG. 5, the processing corresponds to the focus driving timing (6).

Thus, this embodiment previously informs the camera microcomputer C106 of three types of standby time periods, such as the intra-cycle standby time period, the out-of-cycle standby time period, and the actuator standby time period, necessary for the lens microcomputer L106, and thereby prevent the communication, calculation processing, and the actuator control from being lost even with the interchangeable lens having any characteristics.

This embodiment moves the focus lens L105 by repeating the restart determination, wobbling, mountain-climbing, stopping, the wobbling, and restart determination in the TVAF control. Thereby, a focus state can be maintained so that the focus signal can be always maximum.

[Second Embodiment]

A description will be given of a second embodiment according to the present invention. The configuration of the lens interchangeable camera system according to this embodiment is similar to that of the first embodiment (FIG. 1). The overview of the TVAF control is also similar to that of the first embodiment (FIGS. 3 to 5). This embodiment is different from the first embodiment in that the timings at which the intra-cycle standby time period, the out-of-cycle standby time period, and the actuator standby time period are transmitted from the lens microcomputer L106 to the camera microcomputer C106 and the time periods are different according to a circumstance.

Figure 6:
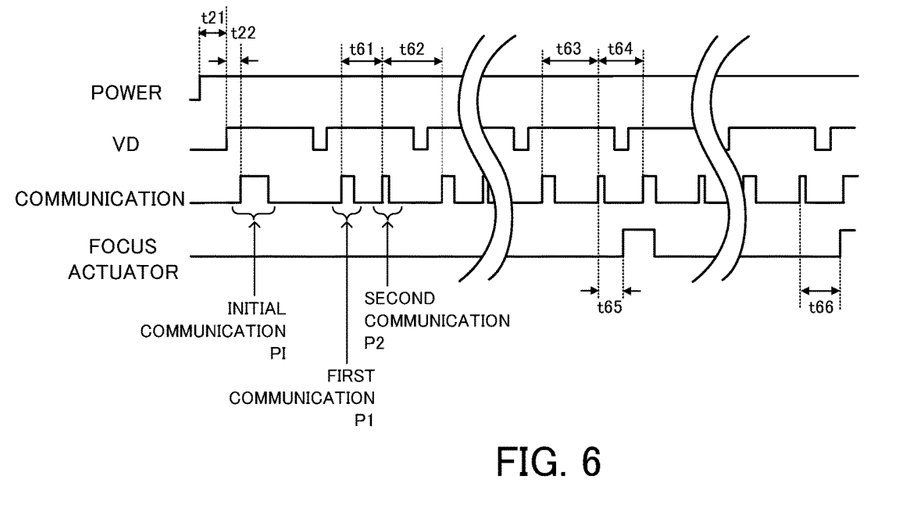
FIG. 6 is a timing chart of a communication between the lens microcomputer and the camera microcomputer illustrated in FIG. 1 according to the second embodiment.

FIG. 6 is a timing chart of a communication between the lens microcomputer L106 and the camera microcomputer C106. A period from the leading edge of the camera power to the initial communication PI is similar to that of FIG. 2 of the first embodiment. The first embodiment transmits the intra-cycle standby time period, the out-of-cycle standby time period, and the actuator standby time period from the microcomputer L106 to the camera microcomputer C106 in the initial communication PI. This embodiment does not transmit each standby time period to the camera microcomputer C106 in the initial communication PI. Rather, each standby time period is sent to the camera microcomputer C106 in the first communication P1. The camera microcomputer C106 sets the timing of each of starting the second communication, starting the first communication in the next cycle, and starting driving the actuator based upon each standby time period received in the first communication.

In FIG. 6, the camera microcomputer C106 sets a time period t61 based upon the intra-cycle standby time period received in the first communication. A time period t62 is set based upon the out-of-cycle standby time period received in the first communication.

Herein, assume that the condition of the lens unit L100 is maintained for a while, and each standby time period transmitted in the first communication has the same value for a while. When the lens microcomputer L106 has increased processing, for example, due to an operation of an image stabilization start switch (or another operation) (not illustrated in FIG. 1) etc., the lens microcomputer L106 changes each standby time period. The camera microcomputer C106 resets a time period between the first communication and the second communication to t61 to t63, and a time period between the second communication and the first communication to t62 to t64 based upon the changed intra-cycle standby time period and out-of-cycle standby time period. The actuator standby time period also changes from t65 to t66 when a time period necessary to start driving the actuator changes as the focus control mode changes, etc.

Thus, this embodiment informs the camera microcomputer C106 of the three types of standby time periods in the first communication, such as the intra-cycle standby time period, the out-of-cycle standby time period, and the actuator standby time period, necessary for the lens microcomputer L106, and can set the standby time period suitable for the current state of the interchangeable lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, a time period from the start of the first communication is set to the intra-cycle standby time period described in each embodiment, a time period from the end of the first communication or a time period from the start of the vertical synchronizing signal may be used. A time period from the start of the second communication is set to the out-of-cycle standby time period but a time period from the end of the second communication or a time period from the start of the vertical synchronizing signal maybe used. Moreover, a time period from the start of the second communication is set to the actuator standby time period but a time period from the end of the second communication, a time period from the start or end of the first communication, or a time period from the start of the vertical synchronizing signal may be used.

The present invention is not limited to each embodiment in which there are two communication blocks in the same cycle and one actuator necessary to set the standby time period. For example, when the camera body provides time-consuming processing for a detection, such as detecting of an image stabilization vector, a third communication block (three communication) is provided after the second communication, and the vector information may be transmitted from the camera body to the interchangeable lens in that timing. When the camera body controls an image stabilization lens, it is necessary for the camera body to provide the actuator standby time period for the image stabilization actuator so as to provide the drive starting timing may be provided. The number may be increased if necessary.

The embodiments of the present invention cover software (computer program) used to realize a function of each embodiment or a system used to supply the software to the image pickup apparatus or lens apparatus including a computer directly from a recording medium or through wire or radio transmissions so as to run the program.

This application claims the benefit of Japanese Patent Application No. 2012-110234, filed on May 14, 2012, which is hereby incorporated by reference herein in its entirety.

INDUSTRIAL APPLICABILITY

The present invention is applicable to a lens interchangeable type camera system, an exchange lens, and a camera body.

REFERENCE SIGNS LIST

L100 lens unit (lens apparatus)
C100 camera body (image pickup apparatus)
L106 lens microcomputer (lens controller)
C106 camera microcomputer (image pickup apparatus controller)

The invention claimed is:
1. A lens apparatus detachable from an image pickup apparatus, the lens apparatus comprising a controller configured to communicate with the image pickup apparatus in synchronization with a synchronizing signal,
   wherein a communication between the lens apparatus and the image pickup apparatus is a packet communication having a plurality of blocks in a cycle of the synchronizing signal,
   wherein the controller transmits information of predetermined time stored in the lens apparatus to the image pickup apparatus, and
   wherein the information of the predetermined time indicates a period in which the lens apparatus prohibits the image pickup apparatus from starting a communication of a first block in a next cycle to a specific cycle, the period starting from a timing at which a communication of a last block in the specific cycle of the synchronizing signal starts or ends.
2. An image pickup apparatus from which a lens apparatus is detachable, the image pickup apparatus comprising a controller configured to communicate with the lens apparatus in synchronization with a synchronizing signal,
   wherein a communication between the image pickup apparatus and the lens apparatus is a packet communication having a plurality of blocks in a cycle of the synchronizing signal, and
   wherein the controller receives information of predetermined time stored in the lens apparatus from the lens apparatus, wherein the information of the predetermined time indicates a period in which the lens apparatus prohibits the image pickup apparatus from starting a communication of a first block in a next cycle to a specific cycle, the period starting from a timing at which a communication of a last block in the specific cycle of the synchronizing signal starts or ends, and the controller starts, after the predetermined time passes after a communication of a last block in a specific cycle of the synchronizing signal starts or ends, a communication of a first block in the next cycle to the specific cycle.
3. An image pickup system comprising a lens apparatus, and an image pickup apparatus from which the lens apparatus is detachable,
   wherein the lens apparatus comprising a lens controller configured to communicate with the image pickup apparatus in synchronization with a synchronizing signal,
   wherein the image pickup apparatus comprising an image pickup apparatus controller configured to communicate with the lens controller in synchronization with the synchronizing signal,
   wherein a communication between the lens apparatus and the image pickup apparatus is a packet communication having a plurality of blocks in a cycle of the synchronizing signal,
   wherein the lens controller transmits information of predetermined time stored in the lens apparatus to the image pickup apparatus controller,
   wherein the information of the predetermined time indicates a period in which the lens apparatus prohibits the image pickup apparatus from starting a communication of a first block in a next cycle to a specific cycle, the period starting from a timing at which a communication of a last block in the specific cycle of the synchronizing signal starts or ends, and
   wherein the image pickup apparatus controller starts, after the predetermined time passes after the communication of the last block in a specific cycle of the synchronizing signal starts or ends, the communication of the first block in the next cycle to the specific cycle.
4. The lens apparatus according to claim 1, wherein the controller transmits the information of the predetermined time to the image pickup apparatus in an initial communication that is performed prior to the packet communication.
5. The lens apparatus according to claim 1, wherein the controller transmits the information of the predetermined time to the image pickup apparatus in a communication of a first block in the specific cycle of the synchronizing signal.
6. The lens apparatus according to claim 4, wherein the initial communication is a block communication initially performed after the lens is attached to the image pickup apparatus or a power of the image pickup apparatus is turned on.
7. The lens apparatus according to claim 1,
   wherein the communication of the last block in the specific cycle of the synchronizing signal and the communication of the first block in the next cycle to the specific cycle are related to functions that the lens apparatus is configured to perform.

8. The lens apparatus according to claim 1,
wherein the controller transmits information of second predetermined time stored in the lens apparatus to the image pickup apparatus, and
wherein the information of the second predetermined time is information to prohibit, before the second predetermined time passes after a communication of an n-th block in a second specific cycle of the synchronizing signal starts or ends, a communication of an m-th block which is performed after the communication of the n-th block in the second specific cycle.

9. The lens apparatus according to claim 8,
wherein a sum of the predetermined time and the second predetermined time is equal to or shorter than a time of the cycle of the synchronizing signal.

* * * * *